INVENTORS
ALFRED C. WINTERHALTER,
WILLIAM E. HOLTKAMP, Jr. &
NORMAN B. BLAKE

BY
ATTORNEYS 2,991,447
SEISMIC SURVEYING METHOD AND APPARATUS
Alfred C. Winterhalter, William E. Holtkamp, Jr., and Norman B. Blake, Beaumont, Tex., assignors to Sun Oil Company, Philadelphia, Pa., a corporation of New Jersey
Filed July 16, 1957, Ser. No. 672,184
2 Claims. (Cl. 340—15)

This invention relates to the art of geophysical exploration and, more particularly, to the production and mixing of seismic records.

The practice of combining a plurality of seismic records in order to improve the signal to noise ratio and in order to cancel out unwanted disturbances is well known in the seismic surveying art. Numerous methods and types of apparatus have been proposed for accomplishing this purpose. Included in such methods are methods involving successively firing variously positioned seismic disturbances or shots, and/or the detection of successive seismic signals by arrays of detectors variously positioned upon the firing of successive shots giving rise to successive seismic signals. Such methods are disclosed in the patent to W. H. Mayne, No. 2,732,906, issued January 31, 1956. Included in such apparatus is generally provision for variously delaying the signals of the individual record channels in order to compensate for variations in detector elevation, variations in detector response, variations in depths of the earth's weathered layer and detector spacing or stepout. Typical of apparatus of this type is the apparatus disclosed in the copending patent application to Bazzoni et al., Serial No. 339,882, filed March 2, 1953, now Patent No. 2,940,536.

It is general practice to produce the original seismic recordings from a single shot on a multi-channel magnetic record member and to reproduce these recordings simultaneously onto a second magnetic record member by means of apparatus, such as noted above, which will adjust the time phase relationships of the various individual recordings during the re-recording process. The adjusted records are then played back and delivered into mixing apparatus for the production of a single combined record. Such processes require elaborate apparatus providing accurate speed control for each re-recording operation and result in a combined record of the recordings from only one shot. A number of these combined recordings must be reproduced and combined together to produce a single record combining the results of a plurality of shots.

It is a primary object of this invention to provide apparatus by means of which a plurality of individual seismic records may be adjusted in time phase relation and combined without the necessity of there being involved an intermediate recording and reproducing step.

More specifically, the invention contemplates the recording of successive groups of seismic records in side by side relation on a single record member with the commencement of the successive recordings in accurately aligned positions on the record member with regard to their respective shot instants, and the subsequent simultaneous reproduction of the records of each of the groups of records on each of a plurality of record members in accurately aligned relationship with regard to the shot instant of each record. The time phase relationship of related events is aligned by proper adjustment of the pickup heads or by the use of electrical delay circuits. The individual records are then delivered to suitable mixing circuits in which corresponding records are mixed, and from which the mixed records are delivered to a multichannel recorder in which all of the records are mixed and from which they are delivered to a single channel recorder. These recorders are preferably of such a type as to provide a visible record.

It is a further object of the invention to provide apparatus by which a plurality of groups of seismic records may be recorded in succession on an extended record member.

These and other objects of the invention relating to details of the method and to details of construction and operation of apparatus for carrying out the method will become evident from the following description when read in conjunction with the accompanying drawings, in which.

Figure 1:
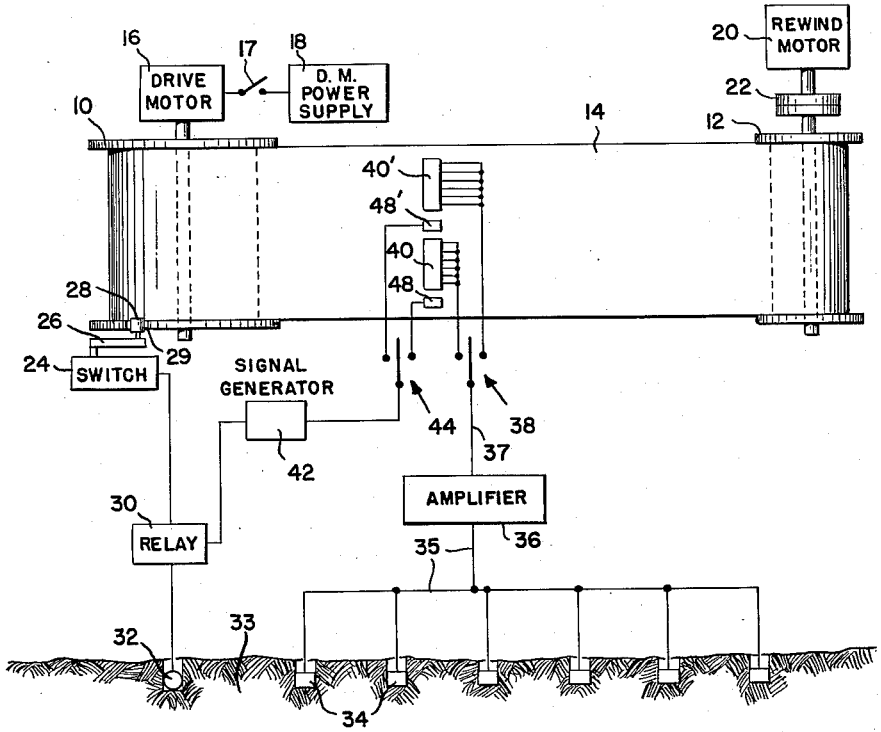
FIGURE 1 is a diagrammatic representation of the apparatus involved in recording successive groups of seismic records in side by side relation on a single record member.

In FIGURE 1 there is shown a drum 10, a second drum 12 and a magnetic record member 14 passing between and extending around each of the drums.

The drum 10 is driven by a drive motor 16 powered from a drive motor power supply 18 through a control switch 17 and thus causes the record tape to progress from the drum 12 to the drum 10. The drive motor 16 is preferably a synchronous motor supplied by power at an accurately controlled frequency from the power supply 18 in order to insure uniformity of tape speed. Such a power supply may be, for example, a 400 cycle tuning fork controlled amplifier.

The drum 12 is connected to a rewind motor 20 through a clutch 22. The clutch is provided with conventional clutch control equipment not shown in the drawing whereby the rewind motor may be coupled to the drum 12 in order to rewind the tape from the drum 10 onto the drum 12. The clutch is, of course, disengaged during periods of drive by the motor 16 in order to minimize the load imposed on the motor 16, but may be arranged to provide slight drag to insure uniform record tape tension during recording.

A switch 24 is controlled by an arm 26 mounting a roller 28 which follows the rim of the drum 10. The rim of the drum 10 is provided with a notch 29 and when the follower 28 drops into the notch 29 the switch 24 is actuated. Actuation of the switch 24 serves to energize the relay 30 and cause a charge 32 positioned in the earth 33 to be fired causing a seismic disturbance in the earth.

Detectors 34 positioned in an array in the surface of the earth 33 are each connected through one of conductors 35 to a channel of a multi-channel amplifier and/or modulator 36 as may be conventionally employed in seismic recording. The outputs of the amplifier and/or modulator are connected through a multi-conductor cable 37 to separate selector arms of a multi-contact switch indicated generally at 38 by means of which the detector outputs are selectively delivered to individual heads of a group of recording heads 40 or a group of recording heads 40'.

Operation of the relay 30 also serves to initiate the operation of the signal generator 42, the output of which is delivered to movable contact of a switch indicated generally at 44 which serves to deliver the output of the signal generator to recording head 48 or to recording head 48'.

While in actual practice approximately twelve detectors and recorder channels are normally employed for each shot recording, only six channels are shown in the drawing in order to simplify the figure. It will be evident, however, that any number of detectors and record channels may be employed carrying out the present invention.

Similarly, while only a single accessory recording head 48 is shown as being connected to the signal generator 42 for each shot recording, a plurality of accessory channels may be provided if desired.

The recording heads 48 and 48' each record a 100 cycle timing wave from the signal generator 42 which serves to provide a time measurement along the length of the seismic record. The heads 48 and 48' also record on the record the instant of shot break, i.e., the instant when the seismic charge 32 is fired.

In operation, the apparatus is arranged with the multichannel record member 14 wound on the drum 12 and the end of the record member 14 attached to the drum 10 with the notch 29 in the rim of the drum being displaced slightly less than 360° from the switch arm roller 28. With the switches 38 and 44 connected to supply signals to the recording heads 40 and 48, respectively, the switch 17 is closed commencing operation of the drive motor 16 and commencing rotation of the drum 10. When the drum 10 has advanced sufficiently to actuate the switch 24, the seismic charge 32 is fired, a shot break signal is recorded by the recording head 48 and the timing signal generator output is recorded on the moving record member 14. The seismic disturbance emanating from the shot 32 gives rise to seismic signals received at the detectors 34 and the outputs of these detectors are individually recorded in side by side channels by the recording heads 40 in the conventional fashion.

After a complete recording is made the switches 44 and 38 are opened and the switch 17 is opened, arresting operation of the drive motor 16. The tape is then rewound on the drum 12 by means of the rewind motor 20 to the start position. The switches 44 and 38 are then positioned to connect the recording heads 40' and 48' with the incoming signals and the switch 17 is again closed to commence operation of the drive motor 16 whereupon, upon actuation of the switch 24, a second set of seismic records are recorded on the record member 14 in side by side relation and in side by side relation with the first set of seismic records. It will be evident that operation of the switch 24 gives rise to accurately aligned positions of the two groups of recordings on the record member. In actual practice the shot break signals are coincidently positioned on the record member to within approximately one one-thousandth of a second in time as the records on the tape are reproduced.

It should be noted that while FIGURE 1 shows only recording of two separate groups of records in side by side relation on the record member 14, a greater number of groups may be successively recorded in side by side relation if a suitably wide record member is provided and a suitable number of recording heads are provided.

Furthermore, after a first pair of successive groups of records have been recorded in side by side relation on the record member 14, a second pair of successive groups of records may be recorded thereon in side by side relation longitudinally displaced from the first pair. The apparatus may be employed to record a substantial number of successive groups of various numbers of side by side recordings on a single sufficiently long record member. Various known means such as index markings or openings in the record member may be employed in conjunction with marks or pins, respectively, on the drum 10 to provide approximate indications of the starting region of each of the groups of records positioned in side by side relation on the record member.

Furthermore, while FIGURE 1 shows only a single shot location 32 and only a single array of detectors 34, the successive shots may be variously positioned and/or the arrays of detectors receiving seismic signals resulting from the successive shots may be variously positioned.

The foregoing apparatus provides, in addition to the other advantages discussed herein, the advantage that the relay 30 may be positioned close to the shot locations and provides complete isolation between the shot detonating device and the recording and control circuits. Thus, there is substantially eliminated any possibility of accidental firing of the shot as a result of stray or induced currents or as a result of accidental short or grounded circuits. This safety feature is of great desirability in view of the extreme hazard involved from the premature firing of seismic charges.

Figure 2:
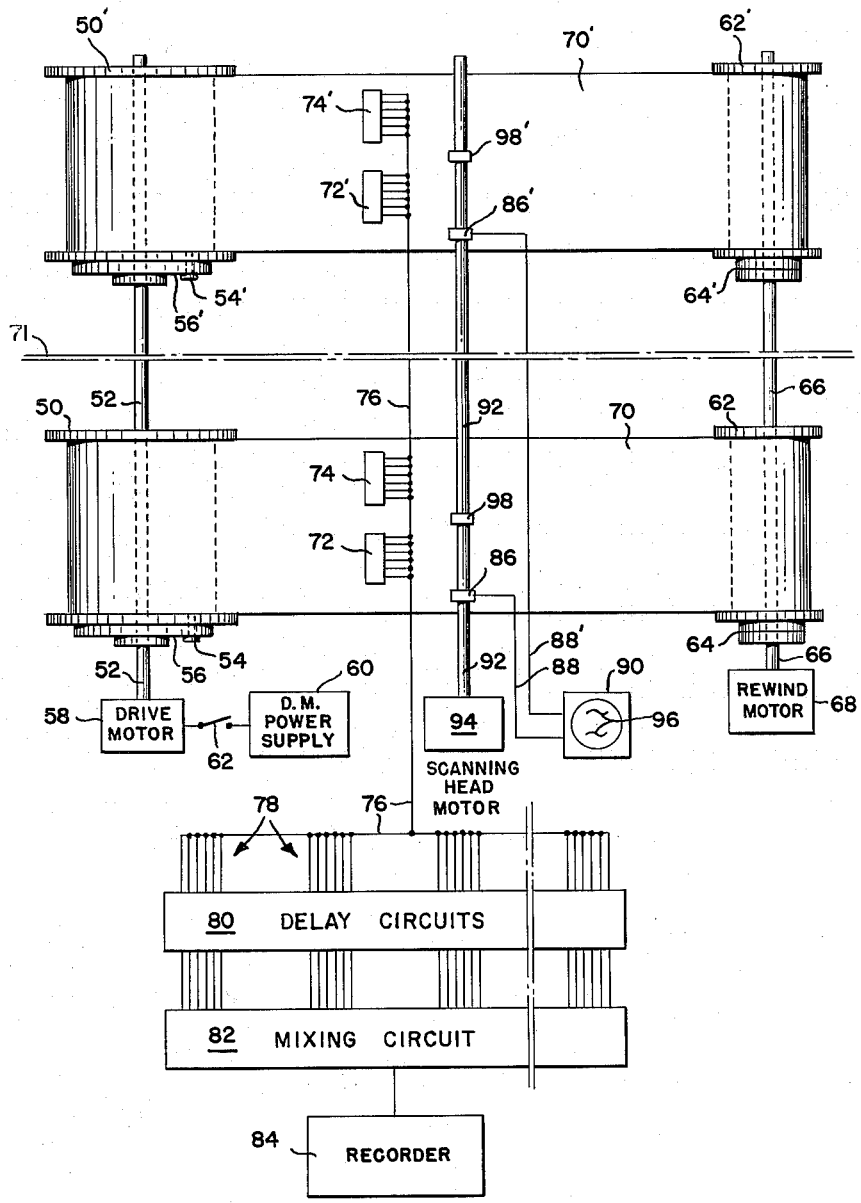
FIGURE 2 is a diagrammatic representation of apparatus for simultaneously reproducing the records of each of the groups of records on each of a plurality of record members.

After a plurality of records have been produced by means of the equipment shown diagrammatically in FIGURE 1, these records may be taken to a laboratory and reproduced simultaneously on apparatus such as that shown diagrammatically in FIGURE 2.

In FIGURE 2 there is shown a drum 50 rotatably mounted on a shaft 52 and adapted to be fixed thereto by means of a bolt 54 passing through an arcuate slot in the disc 56 affixed to the shaft 52. A second drum 50' is similarly mounted on the shaft 52. The shaft 52 is driven by a drive motor 58 supplied by power through a switch 62 from a drive motor power supply 60.

Associated with each of the drums 50 and 50' is a drum 62 and 62', respectively. The drum 62 is rotatably mounted on a shaft 66 and driven thereby through a clutch 64. The drum 62' is similarly mounted and driven. The shaft 66 is driven by a rewind motor 68.

A multi-channel record member 70, carrying recordings produced in the apparatus shown in FIGURE 1, is mounted on the drum 62 with its leading end connected to the drum 50. A second recording 70' is mounted on the drums 62' and 50'. As indicated by the construction lines 71, a greater number than two sets of drums 50 and 62 may be mounted on shafts 52 and 66, respectively, for mounting record members for simultaneous reproduction of recordings. Approximate coincidence of commencement of records on the various record members may be established by means of the index means referred to above.

Pickup heads 72 and 74 are positioned over the record member 70 in locations to pick up the records made by the recording heads 40 and 40' described in connection with FIGURE 1. Similar pickup heads 72' and 74' are positioned over the record member 70'. The outputs of the pickup heads 72, 74, 72' and 74' are connected through a multi-conductor cable 76 and through individual inputs indicated at 78 to a bank of delay circuits 80. The delay circuits may be any of numerous types of apparatus well known in the art for providing a fixed predetermined delay interval serving to compensate for the time displacements of corresponding events on the various individual signal channels. Suitable apparatus for accomplishing this type of delay is disclosed in the patent application of Winterhalter and Evans, Serial No. 690,121, filed October 14, 1957.

The individual signals after passage through the delay circuits and in corrected time phase relationship are delivered to mixing circuits indicated at 82. These mixing circuits are well known in the art and may or may not include various filtering circuits, depending upon noise conditions which may have existed at the time the seismic records were made. If, in the apparatus shown in FIGURE 1, modulation was provided in conjunction with the amplifier 36, then demodulating circuits would be provided at 80 in each record channel prior to the delay circuits. These techniques are well known in the art and apparatus for accomplishing mixing is well known in the art and therefore need not be described in detail herein.

The outputs from the mixing circuits are delivered to a recorder 84 for recording. This recorder is preferably of such a type as to provide visual records and may, for example, involve the conventional galvanometer and camera arrangement. In actual practice there may, for example, be employed a recorder capable of recording twenty-four seismic channels plus several auxiliary channels for shot break, timing, etc. This will permit, for example, the mixing of two seismic shots so that the number 1 channel of each shot will be corrected and mixed and then recorded as number 1 channel on the multi-channel recorder 84. The number 2 channel of each shot will be corrected and mixed and recorded as number 2 channel on the multi-channel recorder 84. The remaining channels will be similarly mixed and recorded. It will be evident that the individual records thus produced by the multi-channel recorder 84 may subsequently be combined to produce a lesser number or even a single record or, alternatively, if desired, all of the signals leaving the mixing circuit 82 may be simultaneously combined to produce a single record in the recorder 84.

Pickup heads 86 and 86' are positioned over the record members 70 and 70', respectively, in such positions as to pick up the accessory channel recordings made by the recording head 48 shown in FIGURE 1. The outputs of these pickups are delivered through conductors 88 and 88' to a multi-channel cathode ray oscilloscope 90.

The pickup heads 86, 86' are mounted on a shaft 92 which is rotated by a motor 94. As will be hereinafter described, the mechanical arrangement is such that the record members pass around a substantial circumferential distance of the rotating scanning or pickup heads 86, 86'. If the record members 70 and 70' are stationary and the scanning heads 86 and 86' are rotated and the portion of the accessory channel carrying the shot break pulse is positioned in engagement with the scanning heads, any displacement in the positions of the shot break pulses of the record members 70 and 70' will be apparent by a displacement of the signal appearing on the oscilloscope 90. The two waves indicated at 96 on the oscilloscope 90 are shown as being in coincident time relation, thus indicating that the shot break pulses providing the signals being viewed on the oscilloscope are also in uniform time phase positions on the two record members.

In the event that when the apparatus is set up and the record members 70, 70' are positioned on the drums 62 and 50, and 62' and 50', these shot break instants are not properly aligned, as indicated by the oscilloscope, the bolts 54 may be loosened and the relative positions of the drums 50, 50' adjusted in order to properly position the record members 70, 70' with respect to each other in order that the starting instant of the seismic records carried by each of the record members may be aligned in accurate relative time positions. After the record members 70, 70' are properly positioned with respect to each other the switch 62 is closed and the drive motor is operated to cause the various record channels to pass the pickup heads 72, 72', 74 and 74', resulting in the individual seismic records being delivered through the delay circuits 80 to the mixing circuit 82, from which the single composite record is delivered to the recorder 84.

After the records have been run, the record members may be rewound on the drums 62, 62' by operation of the rewind motor 68. The clutches 64, 64' are provided in order to connect the drums to the drive shaft 66 during rewind and to disconnect the drums from the shaft during rerecording operation. The clutches may be employed to provide drag to desirably tension the record members during reproduction of the records thereon.

As previously noted, a plurality of successive groups of side by side recordings are carried by the members 70, 70'. The apparatus provides for the making of repeated reproductions of any one set of groups of side by side recordings from a set or a number of record members, prior to reproduction of the next successive group of side by side recordings on the record members. Furthermore, by use of the index marks and the scanning heads, individual record members, in the arrangement shown in FIGURE 2, may be advanced or moved backwardly in order to provide, for example, the combination of the first group of records on the first tape with the second group of records on the second tape. It will be evident that the apparatus is extremely flexible with regard to the selection of recordings to be combined.

Additional scanning heads 98 and 98' mounted on the shaft 92 are positioned to pick up the accessory channel recording made by the recording head 48' shown in FIGURE 1. It will be evident that, if desired, these pickup heads may be employed to determine the accuracy of the positioning of the two sets of recordings on the record members prior to reproduction of the records in the apparatus shown in FIGURE 2.

It is essential to the operation of the apparatus that the records be reproduced at record speeds identical to the speeds at which the records were run when the original recordings were made. As described above in connection with FIGURE 1, the drive motor in FIGURE 1 is a synchronous motor driven by an accurate and constant frequency source. If the drive motor in FIGURE 2 is an identical motor driven by an identical constant frequency 400 cycle source and the diameters of the drums are equal, the record members should move with the same speeds during recording and during reproducing.

Figure 3:
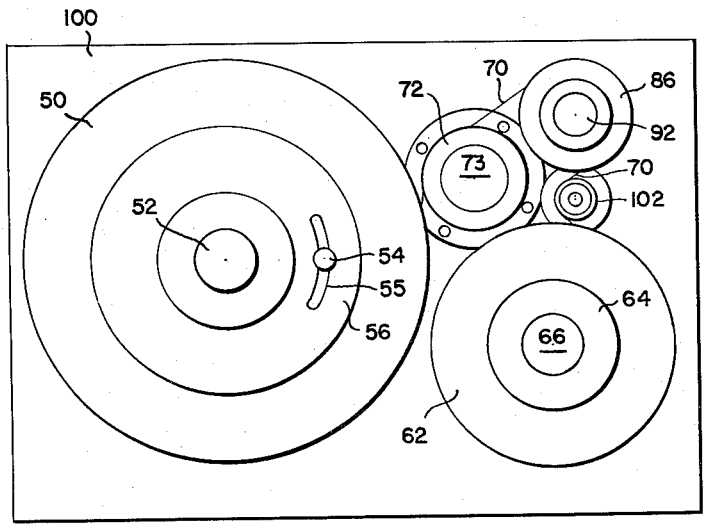
FIGURE 3 is an elevation of actual apparatus employed in carrying the record members shown in FIGURE 2.

In FIGURE 3 there is shown an actual mechanical embodiment of the tape drive and pickup head apparatus shown diagrammatically in FIGURE 2. The drum 50, as shown in FIGURE 3, is rotatably mounted on the shaft 52 and connected thereto through the disc 56 provided with a slot 55 through which there is passed the bolt 54. This arrangement, as previously described, provides for a manual adjustment of the position of the drum 50 on the shaft 52. In FIGURE 3, the shaft 52 extends from a panel 100 and mounts the plurality of drums 50, 50' one behind the other.

The drums 62 are mounted on the shaft 66 also extending from the panel 100 and are connected to the shaft through clutches 64.

A group of pickup heads 72 and 74 are mounted one behind the other on a support post 73 extending from the panel 100 with the pickup head 72 being in the outermost position.

The scanning heads 86 are mounted on the shaft 92 which extends from the panel 100 and a tape idler roller 102 is provided between the scanning head 86 and the drum 62.

The relative positions of the scanning head 86, the pickup heads 72 and the idler roller 102 are such as to position the tape 70 around a substantial portion of the scanning head 86. As shown in FIGURE 3, this is approximately a 180° peripheral engagement.

It will now be evident that, as previously described, upon rotation of the shaft 92 the scanning heads 86, 86' will scan a substantial length of their associated tapes 70 and 70', and by adjustment of the relative tape positions, by means of the bolt 54 and the slot 55, the time break signals on the tapes 70 and 70' may be adjusted to be in accurately aligned positions.

The apparatus and the method involved herein have the particular advantage in that it is not necessary to have the entire record member extending around one revolution of a drum, thus, speed control is greatly facilitated and, furthermore, an extended record member may be employed whereby a succession of side by side groups of seismic records may be recorded successively on a single record member.

While the apparatus described in connection with FIGURE 2 shows the use of delay circuits for providing time phase adjustments between the individual record channels, weathering and elevation displacement correction may be provided by means of relatively movable reproducing heads in the manner well known in the art.

While in the apparatus heretofore described, the record member 14, shown in FIGURE 1, is employed for recording originally received seismic signals, the record member may, if desired, be employed for receiving signals reproduced from an original seismic recording. Thus, individually recorded groups of seismic records may be rerecorded in adjacent positions on the record member 14 and in successive positions on the record member 14. By this procedure, various individually recorded groups of records may be prepared for combination by means of the apparatus described herein.

In the event that originally recorded records are re recorded onto the record member 14, there is necessarily employed rigid speed control. The originally recorded records are conventionally recorded in association with a suitable timing wave such as, for example, a 100 cycle timing wave. By the employment of this wave and speed control apparatus such as, for example, that disclosed in the patent to William T. Evans, Serial No. 2,774,927, dated December 18, 1956, the originally received seismic signals may be reproduced at a rate identical to the rate at which they were originally received and, thus, the recordings imposed on the record member 14 will be perfect reproductions of the signals originally received.

This application represents a further development of the apparatus disclosed in the copending but now abandoned application of Alfred C. Winterhalter, Serial No. 235,166, filed July 5, 1951.

What is claimed is:

1. Apparatus for seismic surveying comprising means for successively recording permanently on each one of a plurality of record members a plurality of groups of seismic recordings in side-by-side relation, means controlled by said recording means for initiating the seismic disturbance from which each of the groups of records results and providing in the case of each record member for commencement of the groups of seismic recordings thereon in accurately aligned positions, means for recording on each of said record members an indication of the instant of the shot from which at least one group of seismic recordings thereon results, means including rotating scanning heads responsive to shot instant indications recorded respectively on said record members to position the commencement of the seismic recordings thereon in accurately aligned positions, and means for simultaneously reproducing all of the seismic recordings on all of said record members, and means for combining the outputs of said simultaneously reproduced seismic records.

2. A method of seismic surveying comprising the steps of initiating a plurality of successive seismic disturbances, successively recording on adjacent longitudinal sections of an elongated record member a plurality of groups of permanent seismic recordings in side by side relation, each of said groups of seismic recordings comprising a record of one of said seismic disturbances, in the case of each section of each record member commencing the recordings thereon in accurately aligned positions, successively adjusting the relative positions of said plurality of record members to position for each successive adjustment the commencement of the recordings on selected record sections respectively of said record members in accurately aligned positions, simultaneously reproducing all of the recordings on all of said aligned selected record sections for each successive adjustment, and combining the outputs of each of said simultaneously reproduced records.

References Cited in the file of this patent

UNITED STATES PATENTS

| | | |
|---|---|---|
| 2,767,389 | McCollum | Oct. 16, 1956 |
| 2,795,287 | Sharpe | June 11, 1957 |
| 2,806,545 | Schempf | Sept. 17, 1957 |
| 2,888,663 | Blake et al. | May 26, 1959 |